United States Patent
Hewitt et al.

(10) Patent No.: US 10,652,122 B2
(45) Date of Patent: *May 12, 2020

(54) ANALYSIS OF VARIANCE IN NETWORK PAGE ACCESS

(71) Applicant: International Business Machines Corporation, Armonk, NY (US)

(72) Inventors: Trudy L. Hewitt, Cary, NC (US); Matthew C. Hillary, Kihei, HI (US); Lee A. Jacobson, Bryon, MN (US); Michael S. Thomason, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,091

(22) Filed: Nov. 18, 2016

(65) Prior Publication Data

US 2017/0070411 A1 Mar. 9, 2017

Related U.S. Application Data

(63) Continuation of application No. 13/758,430, filed on Feb. 4, 2013, now Pat. No. 9,571,368.

(51) Int. Cl.
*G06F 15/173* (2006.01)
*H04L 12/26* (2006.01)

(52) U.S. Cl.
CPC ......... *H04L 43/0876* (2013.01); *H04L 43/16* (2013.01)

(58) Field of Classification Search
CPC ..... H04L 63/10; H04L 43/16; H04L 12/2856; H04L 12/287; H04L 67/22; H04W 48/08;
(Continued)

(56) References Cited

U.S. PATENT DOCUMENTS 6,792,458 B1 9/2004 Muret et al.
7,146,416 B1 12/2006 Yoo et al.
(Continued)

OTHER PUBLICATIONS

Contoleon, Anthony. "Finding Google Analytic's Zero's; How to Find Pages Without Traffic," Search Engine People, posted Jul. 14, 2012, <http://www.searchenginepeople.com/blog/finding-google-analytics-zeros.html>, printed Nov. 8, 2012.

Harper, Jay. "Bad Bots Confound Web Analytics by Executing Javascript Tags," posted May 19, 2008 <http://www.seomoz.org/ugc/bad-bots-confound-web-analytics-by-executing-javascript-tags>.

Lee, J. et al. "Classiification of web robots: An empirical study based on over one billion requests," Comput. Secur. (2009), doi: 10.1016/j.cose.2009.05.004, Crown Copyright © 2009 published by Elsevier Ltd.

(Continued)

*Primary Examiner* — Suraj M Joshi
*Assistant Examiner* — Ayele F Woldemariam
(74) *Attorney, Agent, or Firm* — David B. Woycechowsky

(57) ABSTRACT

Analyzing communication network data set access of a data set group constituted by multiple data sets. The method includes the following steps: (i) determining, for a first interval, a first low access count value corresponding to an amount of data sets in the data set group that have been accessed, in the first interval, an amount of times that is no greater than a low access threshold value; (ii) determining, for a second interval, a second low access count value corresponding to an amount of data sets in the data set group that have been accessed, in the second interval, an amount of times that is no greater than the low access threshold value; and (iii) determining a delta value based, at least in part, on a difference between the first low access count value and the second low access count value.

12 Claims, 5 Drawing Sheets

(58) Field of Classification Search
CPC ........... G06F 17/30165; G06F 11/3476; G06F 17/3087; G06F 17/3089; G06F 2201/81
See application file for complete search history.

(56) References Cited

U.S. PATENT DOCUMENTS

| | | | | |
|---|---|---|---|---|
| 7,523,016 | B1* | 4/2009 | Surdulescu | G06F 21/316 702/185 |
| 7,752,308 | B2 | 7/2010 | Hutchinson | |
| 7,904,330 | B2 | 3/2011 | Uyama et al. | |
| 7,987,173 | B2 | 7/2011 | Alexander | |
| 8,291,499 | B2 | 10/2012 | Aziz et al. | |
| 8,412,569 | B1* | 4/2013 | Benson | G06Q 30/02 705/14.1 |
| 8,566,483 | B1* | 10/2013 | Chen | G06F 3/0605 710/18 |
| 2004/0019677 | A1* | 1/2004 | Fukumoto | G06F 11/3447 709/224 |
| 2004/0025055 | A1 | 2/2004 | Hamadi et al. | |
| 2005/0262240 | A1 | 11/2005 | Drees et al. | |
| 2008/0016246 | A1 | 1/2008 | Singh | |
| 2009/0024735 | A1 | 1/2009 | Peddemors | |
| 2009/0183037 | A1* | 7/2009 | Hamaguchi | H04L 41/142 714/704 |
| 2011/0119226 | A1* | 5/2011 | Ruhl | G06F 17/3089 706/52 |
| 2011/0307936 | A1 | 12/2011 | Braendle et al. | |
| 2012/0042124 | A1* | 2/2012 | Miyamoto | G06F 3/0605 711/114 |
| 2012/0117030 | A1* | 5/2012 | Sakuma | G06F 17/303 707/654 |
| 2012/0240185 | A1 | 9/2012 | Kapoor et al. | |
| 2014/0222990 | A1 | 8/2014 | Hewitt et al. | |
| 2015/0186401 | A1* | 7/2015 | Baldwin | G06F 17/30135 707/693 |

OTHER PUBLICATIONS

Mao, Y. et al. "MOT: Memory Online Tracing of Web Information System," pp. 271-277, © 2002 IEEE.

Mukherjee, Bhaskar. "Analysing usability and accessibility of India's three popular commercial websites—Rediff, Indiatimes and Sify," Annals of Library and Information Studies, vol. 58, pp. 249-256, Sep. 2011.

Perry, Matt. "Annoying Robots: A Solution for Google Analytics," posted Apr. 27, 2012, <http://stkywll.com/2012/04/27/annoying-robots-a-solution-for-google-analytics/>.

Tordable, Javier. "Official Google Webmaster Central Blog: Search Queries Alerts in Webmaster Tools," posted Aug. 20, 2012, <http://googlewebmastercentral.blogspot.com/2012/search-queries-alerts-in-webmaster-tools.html>.

Valdes, A. et al. "An Architecture for an Adaptive Intrusion-Tolerant Server," Journal Springer-Verlag, 2002, Cambridge, Series LNCS, >http://www.csl.sri.com/papers/protocols_sri_02/.

Xie, Y. et al. "Monitoring the Application-Layer DDoS Attacks for Popular Websites," IEEE/ACM Transactions on Networking, vol. 17, No. 1, pp. 15-25, Feb. 2009, doi: 10.1109/TNET.2008.925628.

Zheng, N. et al. "Capturing "Human Bandwidth": A Multidimensional Model for Measuring Attention on Web Sites", International Journal on Media Management, vol. 14, issue 2, pp. 157-179, downloaded on Oct. 22, 2012, At: 14:06, Publisher: Routledge, <http://dx.doi.org/10.1080/14241277.2011.619153 >.

"Alert: Google Instant Previews are being tracked as pageviews in GA—Google Groups" posted Nov. 10, 2010.

"Windows SharePoint Services 3.0 Help and How-to Manage sites and site collections", date printed Nov. 8, 2012, <https://www.idmedicaid.com/_layouts/help.aspx?Icid=1033&cid0=MS.WSS.manifest&tid=MS.WSS.HA10157781>.

"Zombie Robots Are Eating My Site," Netmeg, posted Mar. 19, 2012, printed Nov. 8, 2012, <http://netmeg.com/bot-attack/>.

* cited by examiner

ANALYSIS OF VARIANCE IN NETWORK PAGE ACCESS

FIELD OF THE INVENTION

The present invention relates generally to the field of network data communications in networks where network pages (for example, web pages) are served by server computers and accessed by various client computers over a data communication network.

BACKGROUND OF THE INVENTION

Data communication networks and "network pages" (see DEFINITIONS section) are known. One example of such a network is the internet, which facilitates service of network pages in the form of web pages. On the internet, web pages are "served" by server computers over the internet, to various client computers, responsive to requests made by users (see DEFINITIONS section). Entities that control and manage web page(s) are often interested in how often that entity's web pages are accessed and in who accesses the web page(s).

Web traffic is the amount of data sent/received by visitors to a given web site. Web traffic is generally determined by the number of visitors and the number of pages they visit. Sites monitor the incoming and outgoing traffic to see which parts or pages of their site are popular and to identify trends. There are many ways to monitor this traffic and the gathered data is used to: (i) help structure sites; (ii) highlight security problems; and/or (iii) indicate a potential lack of bandwidth. For most web sites, not all data collected on web traffic can be considered to be meaningful for purposes of web analytics. Web analytics is the measurement of the behavior of website visitors. In commercial contexts, web analytics primarily refers to the measurement of which aspects of the website work towards business objectives. Web traffic is conventionally analyzed by using the traffic statistics found in the web server log file, an automatically generated list of all the pages served. A hit is usually generated when any file is served. The page itself is considered a file, but images are also files, thus a page with 6 images could generate 7 hits, specifically the 6 images and the web page itself. A page view is usually generated when a visitor requests a page within the web site. A visitor will usually generate at least one page view (the main page), but could generate many more. Tracking applications external to the web site can record traffic, usually by inserting a small piece of HTML code in every page of the web site.

Other examples of how not all automated web traffic measures obtain meaningful results as described as follows. Web traffic based on web pages served to bots may be filtered out of web traffic statistics so that analysts can focus on human users (see DEFINITIONS section) who access the web page. In addition, search engine operation (normal operations, new operations, abnormal operations, etc.) may cause false or misleading web traffic statistics.

SUMMARY

According to an aspect of the present invention, there is a method for analyzing communication network data set access of a data set group constituted by a plurality of data sets. The method includes the following steps (not necessarily in the following order): (i) determining, for a first interval, a first low access count value corresponding to an amount of data sets in the data set group that have been accessed, in the first interval, an amount of times that is no greater than a low access threshold value; (ii) determining, for a second interval, a second low access count value corresponding to an amount of data sets in the data set group that have been accessed, in the second interval, an amount of times that is no greater than the low access threshold value; and (iii) determining a delta value corresponding to a change in low access data set(s) of the data set group based, at least in part, on a difference between the first low access count value and the second low access count value. At least one of the steps is performed by computer software running on computer hardware.

DETAILED DESCRIPTION

Figure 1:
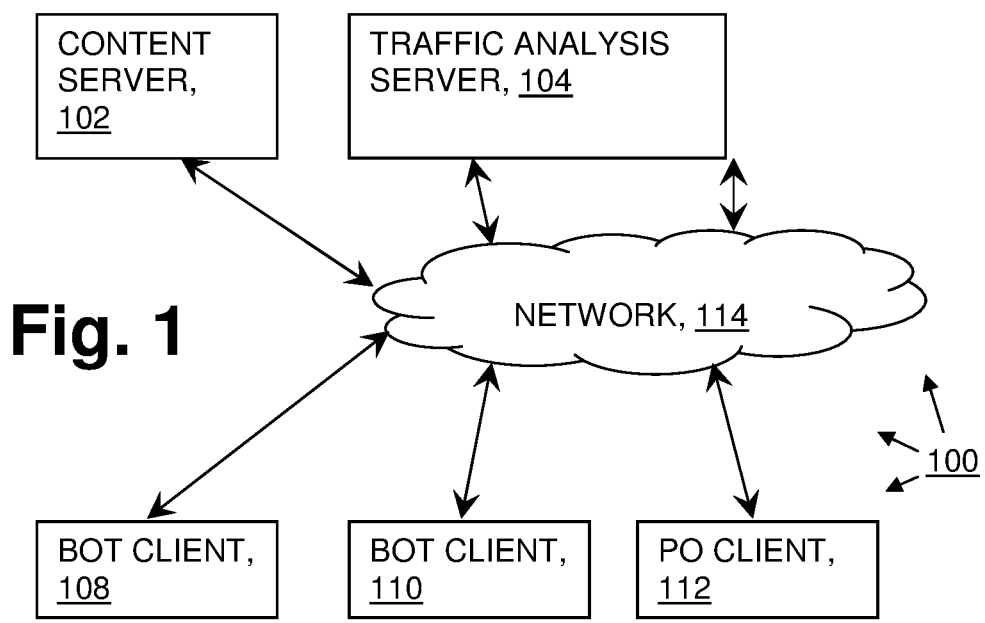
FIG. 1 is a schematic view of a first embodiment of a computer system according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIGS. 1, 2A, 2B, and 3 collectively make up a functional block diagram illustrating various portions of distributed data processing system 100, including: content server sub-system 102; traffic analysis server sub-systems 104; bot client sub-systems 108, 110; plain old (po) client 112; communication network 114; content server computer 200; traffic analysis server computer 250; communication units 202, 252; processor sets 204, 254; input/output (i/o) units 206, 256; memory devices 208, 258; persistent storage devices 210, 260; display devices 212, 262; external device sets 214, 264; random access memory (RAM) devices 230, 270; cache memory devices 232, 272; serve module (mod) 240; web page data sets 244a to z; traffic analysis module 280; low access sub-mod 282; identify key parameters sub-sub-module 302; fetch access information sub-sub-mod 304; delta sub-sub-mod 306; responsive analysis sub-sub-mod 310; browser analysis sub-sub-sub-mod 320; search engine analysis sub-sub-sub-mod 322; and new bot sub-sub-sub-mod 324.

Server computer sub-system 102 (see FIG. 2A) is, in many respects, representative of the various computer sub-system(s) in the present invention. Several representative portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Serve mod 240 is a representative software module, and is a collection of machine readable instructions and data that is used to create, manage and control certain software functions that will be discussed in detail below.

Server computer sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIGS. 1, 2A, 2B and 3, taken together, illustrate one implementation (that is, system 100) and do not imply any limitations with regard to the environments in which different embodiments may be implemented. Many modifications to the depicted environment may be made, especially with respect to current and anticipated future advances in cloud computing, distributed computing, smaller computing devices, network communications and the like.

Figure 2A:
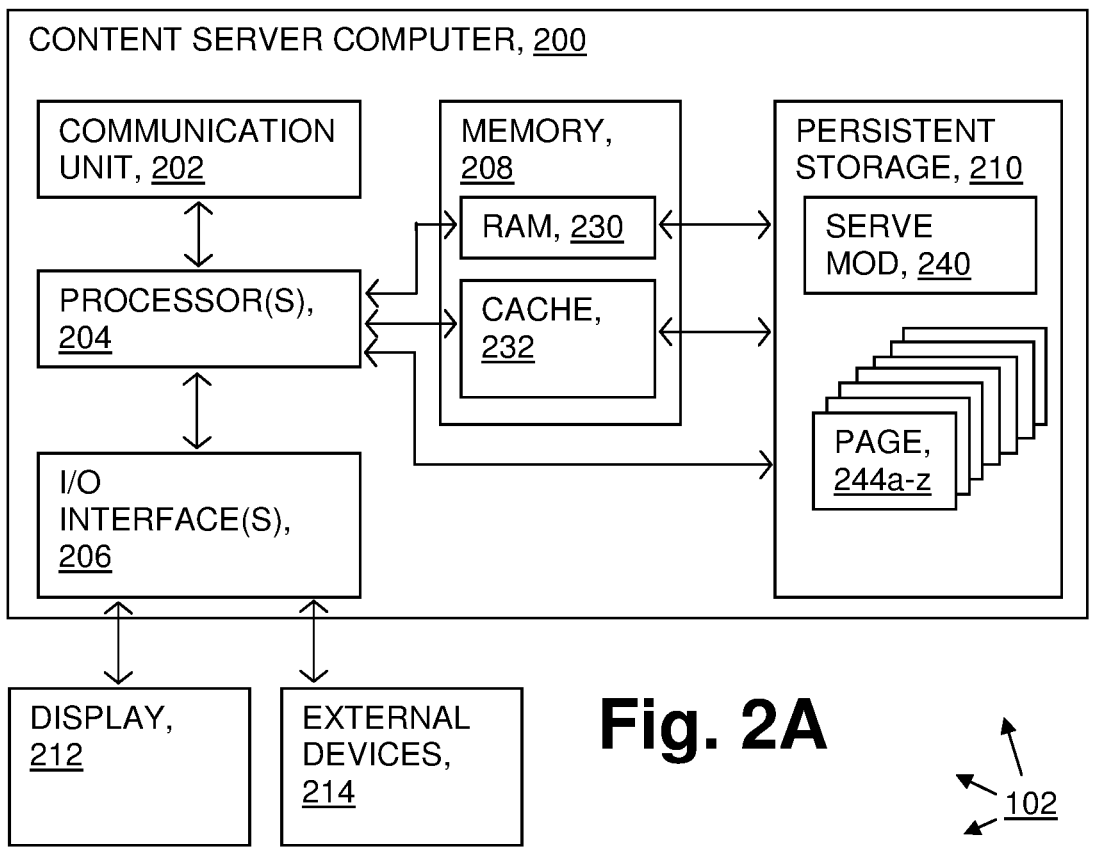
FIG. 2A is a schematic view of a portion of the first embodiment computer system.

As shown in FIG. 2A, server computer sub-system 102 is shown as a block diagram with many double arrows. These double arrows (no separate reference numerals) represent a communications fabric, which provides communications between various components of sub-system 102. This communications fabric may be implemented with any architecture designed for passing data and/or control information between processors (such as microprocessors, communications and network processors, etc.), system memory, peripheral devices, and any other hardware components within a system. For example, the communications fabric may be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory sub-system 102.

Serve module (or mod) 240 is stored in persistent storage 210 for access and/or execution by one or more of the respective computer processors 204, usually through one or more memories of memory 208. Persistent storage 210 is at least more persistent than a signal in transit is, but the persistent storage may, of course, be substantially less persistent than permanent storage. Mod 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 enables input and output of data with other devices that may be connected locally in data communication with server computer 200. For example, I/O interface 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, mod 240, can be stored on such portable computer-readable storage media. In these embodiments the relevant software may be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 4:
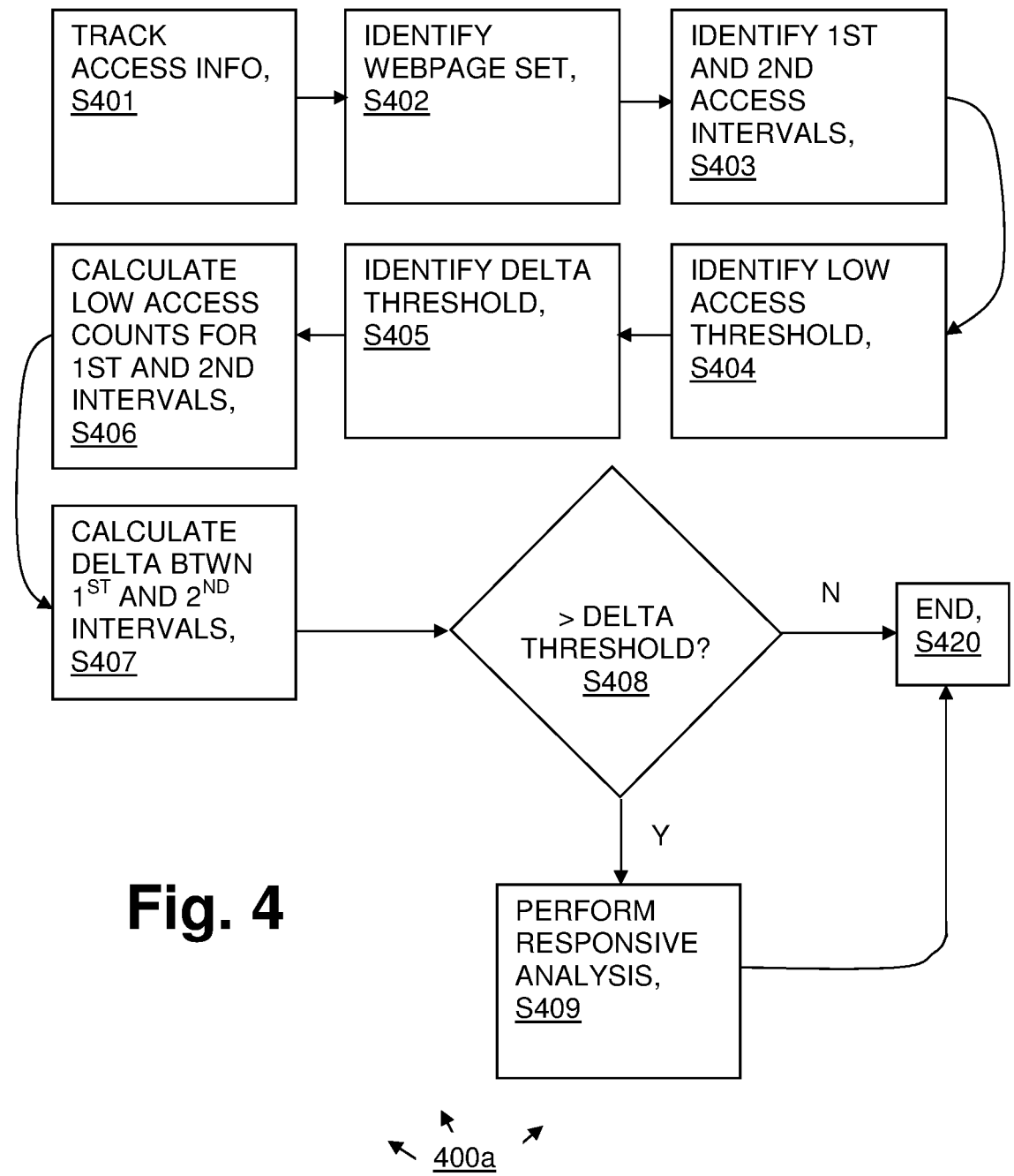
FIG. 4 is a flowchart showing a process according to the present invention.

As shown in FIG. 4, flowchart depicting process 400*a* is a process in accordance with an embodiment of the present invention. The various steps of process 400*a* will now be discussed in turn.

Processing starts at step S401 where access to the various web pages are tracked on an ongoing basis. In this example, the web pages that are tracked are pages 244*a* to *z* served by serve mod 240 of content server computer 200 (see FIG. 2A). This tracking is preferably performed in real time, and may include any sort of information collection about page visitors that it is now currently conventional to collect and/or which may become collectible in the future. Entities that manage and control web pages usually want to collect as much information about web page visitors as possible, and, in the present information, any and all collectible information may end up being useful later in the process when low access pages are analyzed for anomalies, filtering and the like.

In this example, all of the "servable-and-trackable data sets" (see DEFINITIONS section) are web pages 244*a* to *z*. In other embodiments, the servable-and-trackable data sets may include other types of network pages and/or other kinds of data sets, such as files.

In this example, there are only 26 web pages in the "servable-and-trackable data set group" (see DEFINITIONS section). These 26 web pages are commonly managed, controlled and tracked by a common management entity. In other preferred embodiments, the number of data sets in a group will be much, much larger. Generally speaking, larger groups of data sets can help to accurately identify "anomalies" (see DEFINITIONS section) because these larger groups provide a larger sample size for determining unusual phenomena.

Figure 2B:
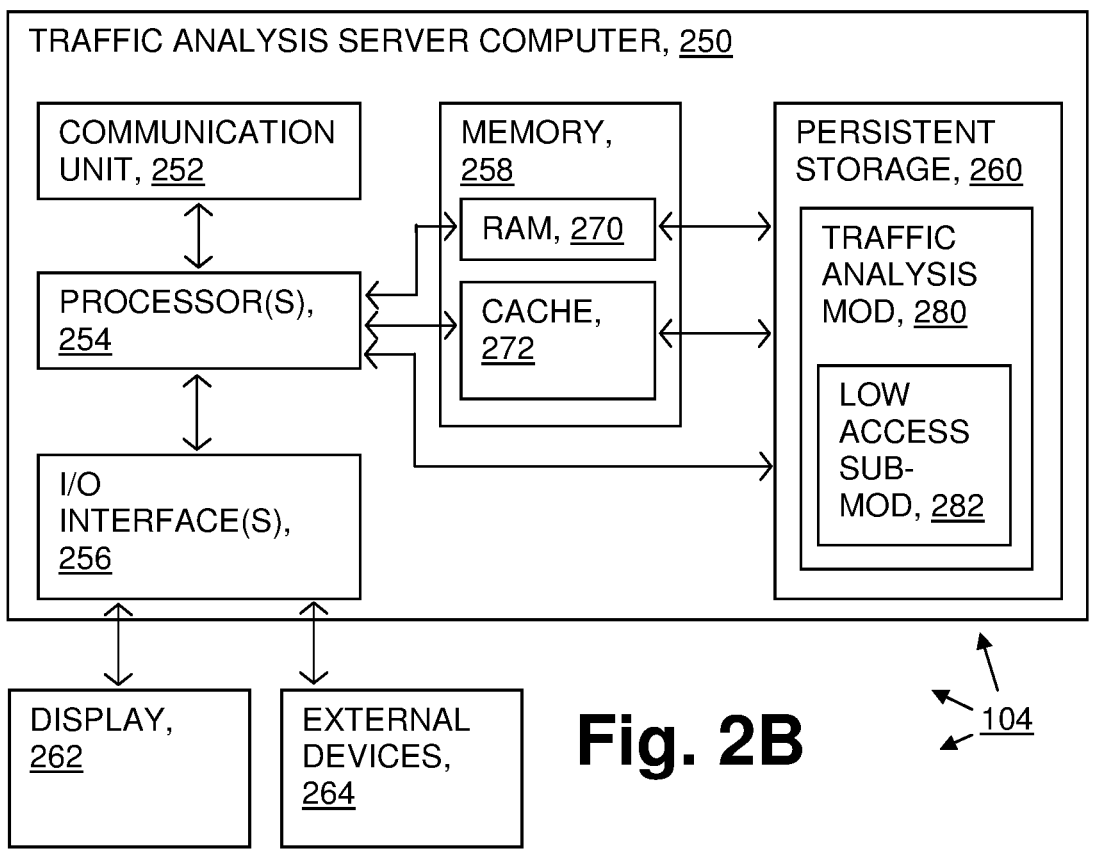
FIG. 2B is a schematic view of a portion of the first embodiment computer system.
Figure 3:
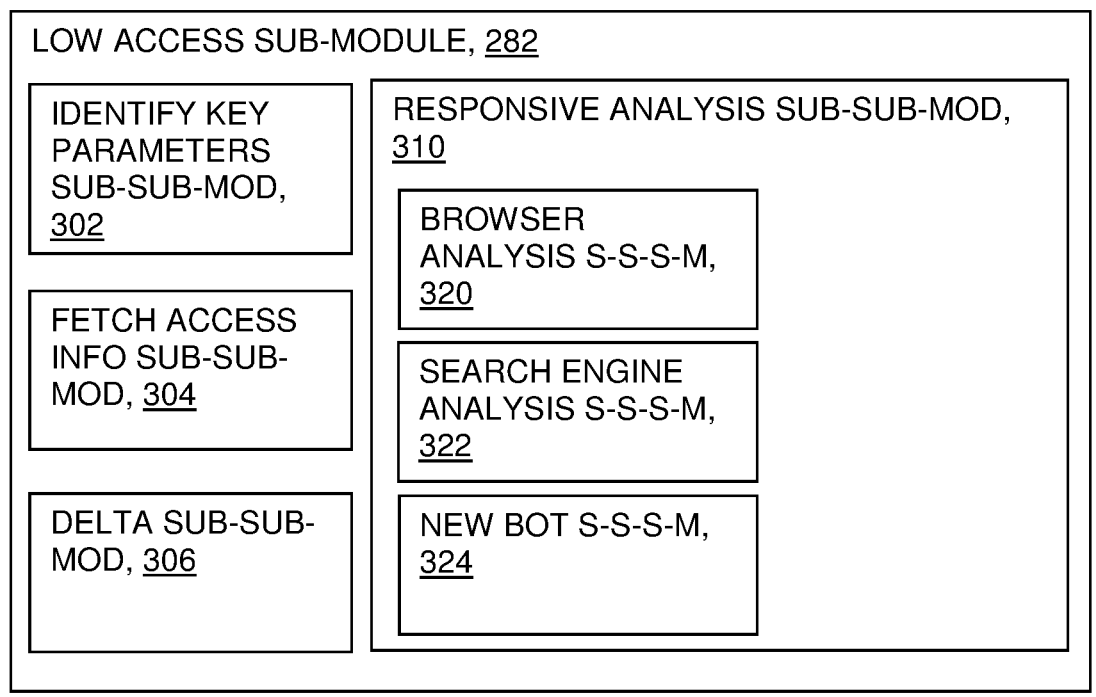
FIG. 3 is a schematic view of a portion of the first embodiment computer system.

Processing proceeds to step S402 where identify key parameters sub-sub-mod 302 of low access sub-mod 282 of traffic analysis mod 280 of traffic analysis server computer 250 identifies a set of web pages that will undergo low access analysis according to process 400*a* (see FIGS. 2*b* and 3). In this example, it is data for all web pages 244*a* to *z* that will be analyzed. In other words, at step S402, the identify key parameters sub-sub-mod identifies the servable-and-trackable data set group that is low-access analyzed according to the present invention.

Processing proceeds to step S403 where two things happen as follows: (i) the identify key parameters sub-sub-mod identifies the first and second access intervals that are to be compared to each other; and (ii) fetch access information sub-sub-module 304 fetches data set access related information for the web page group for the two time intervals that are to be compared to each other. These two sub-steps will be respectively discussed in the following two paragraphs.

The identify key parameters sub-sub-mod identifies the two time intervals to be compared to each other for low access anomalies by either: (i) allowing a user (for example, an employee of the entity that creates and maintains the web pages) to input the two time intervals; or (ii) automatically determining the two time intervals by software. For example, the two successive time intervals may be two successive months, two successive weeks or two successive days (see window 502 of screenshot 500*a* of FIG. 5). The appropriate interval may depend on such factors as the number of searchable-and-trackable data sets in the group undergoing low-access analysis, and/or the number of third party users that access the data sets in the group during normal operations.

When the intervals are specified, then access information for the group of data sets is fetched. In this example, the access data for data sets 244*a* to *z* is all maintained in traffic analysis mod 280 of traffic analysis server computer 250 (see FIG. 2B), so the fetching is simple and local. In other embodiments, other computers, such as content server computer 200 of sub-system 102 (see FIGS. 1 and 2A) may need to be accessed to fetch the needed information to perform low-access analysis on the data set group. The fetched information includes at least the number of times that each data set in the group has been accessed over each of the first and second time intervals. However, in some preferred embodiments, the fetched information includes additional information (for example, IP addresses of client computers requesting each respective access of each respective data set) so that anomalies can be better identified and/or explained by the analysis of the present invention.

Processing proceeds to step S404 where a "low access threshold" is identified by delta sub-sub-mod 306 (see FIG. 3). The low access threshold may be specified by a user, or specified automatically by the software. In this example, the low access threshold will be zero (0) access request(s). This low access threshold may be an absolute number, or a relative quantity, such as one percent of a mean (average) number of accesses in the data set group.

Processing proceeds to step S405 where a "low delta threshold" is identified by delta sub-sub-mod 306 (see FIG. 3). The low delta threshold may be determined by a user, or determined automatically by the software. In this example, the low delta threshold is 50% (see window 502 of FIG. 5). This low delta threshold may be set by a user (see window 502 in FIG. 5), or it may be determined automatically by software. This low delta threshold will preferably be a relative quantity. In this example, the low delta threshold is a quantity relative to the low access number for the first time interval, as will be discussed below in more detail. Alternatively, the low delta threshold may be a quantity relative to the total number of data sets in the group, or a relative quantity based upon some other basis.

Figure 5:
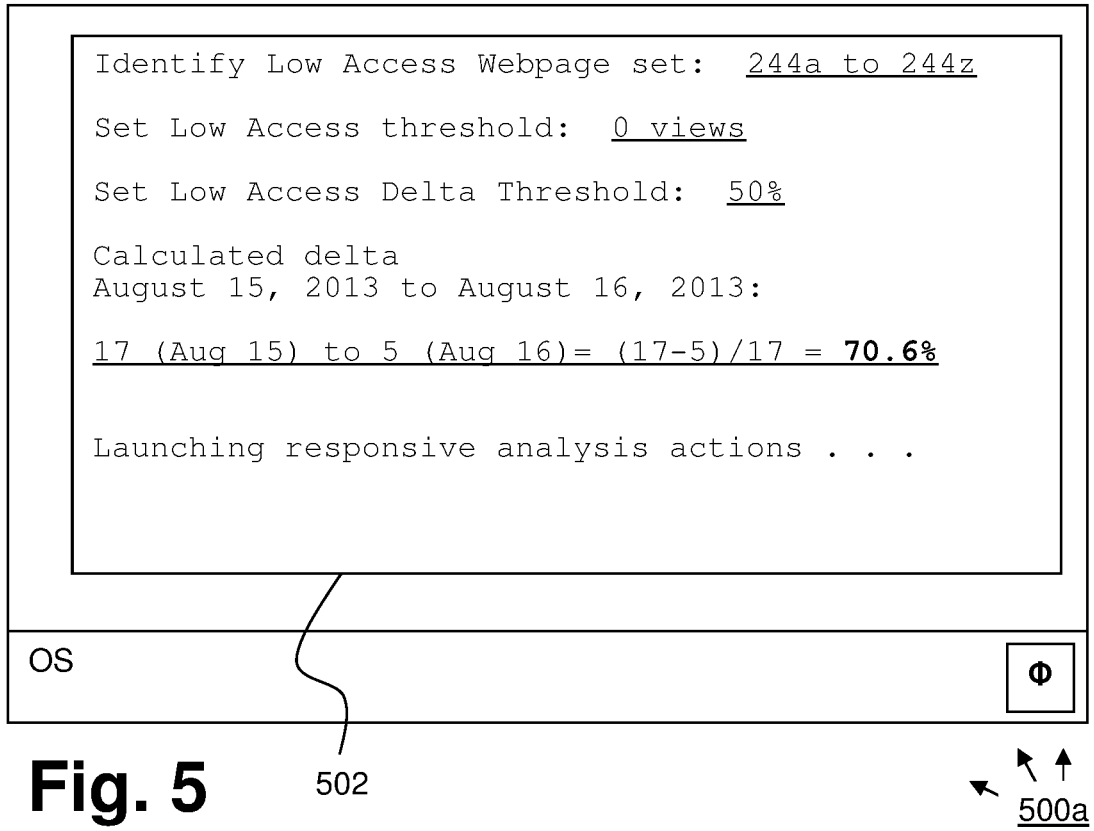
FIG. 5 is a screenshot generated by the first embodiment computer system.

Processing proceeds to step S406 where delta sub-sub-module calculates low access counts for the data set group for each data set (in this example, web pages 244*a* to *z*) for both of the first and second intervals based upon: (i) the low access threshold determined at step S404; (ii) the number of accesses for each respective data set in the first interval as fetched at step S403; and (iii) the number of accesses for each respective data set made in the second interval as fetched at step S403. As shown in FIG. 5, for this example, the low access count for web pages 244*a* to *z* is: (i) 12 in the first interval; and (ii) 5 in the second interval.

Processing proceeds to step S407 wherein the "delta" is calculated. In this example, the delta is calculated, as shown in FIG. 5, by subtracting the low access count for the second interval from the low access count for the first interval, dividing by the low access count for the first interval, multiplying by 100 (to yield a percentage value) and rounding off. In this example, and as shown in FIG. 5, the delta is 70.6%.

In the current example, the delta is calculated using the first low access count as a basis for determining proportional change in the low access count because the low access threshold (that is, 50% in this example) was determined in light of that particular basis. However, there are alternative possible bases to be used to determine proportionate change in the low access count when calculating the delta value at step S407. For example, a "historical" low access count (based upon a long history of intervals) may be used as a basis for delta. As a further alternative, a mean (average) value of the first and second low access counts may be used as a basis for calculating the proportionate change in access counts.

As a further possible variation on step S407, negative delta values may or may not be treated the same as positive delta values. As a simple example, negative delta values might simply be converted into positive values. In a more complex variation, a positive delta value and a negative delta value might be calculated on a different basis. For example: (i) a positive delta may be calculated based upon the first-interval low access count (as in the example of FIG. 5); while (ii) a negative delta might alternatively utilize the second-interval low access count. As a further variation on this theme, negative deltas (that is increases in the number of low access pages) might be ignored entirely, and treated as zero deltas. The system designer should choose a specific delta calculation algorithm based upon what is most likely to accurately and reliably discover anomalies for a given application.

In a further variation on steps S406 and S407, the delta value may be based upon the number of data sets in the group that changed their low-access status, regardless of whether: (i) a particular data set that was at or below the low access threshold in the first interval went over the threshold in the second interval; or (ii) a particular data set that was above the low access threshold in the first interval went below the threshold in the second interval. For this type of delta calculation scheme, each particular data set would get a value as to whether it changed low access status between the intervals, and it is these status changes that would be counted in order to calculate the delta value. Once again, there are possible variations on this particular delta variation scheme. For example, over-threshold to under-threshold changes might be simply ignored, instead of being used to raise the delta.

Processing proceeds to step S408 where it is determined, by the delta sub-sub-mod, whether the delta (however calculated) is greater than the low delta threshold. In this example, and as shown at FIG. 5, the 70.6% delta value is indeed greater than the 50% low delta threshold that was set. If the delta value is not greater than the threshold, then processing ends at step S420.

If the delta value is above the low delta threshold, then processing proceeds to step S409 where responsive analysis sub-sub-mod 310 of low access sub-mod 282 of traffic analysis mod 280 of traffic analysis server computer 250 (see FIGS. 2B and 3). More specifically: (i) browser analysis sub-sub-sub-mod 320 determines whether changes to any browsers have caused a browser specific anomaly to drive the delta up above the low delta threshold; (ii) search engine analysis sub-sub-sub-mod 322 determines whether changes to any search engines have caused a search engine specific anomaly to drive the delta up above the low delta threshold; and (iii) new bot sub-sub-sub-mod 324 determines any new bot-related anomalies. In this example, low access sub-module 282 determines that: (i) bot client sub-system 108 and po client sub-system 112 (see FIG. 1) made some of the accesses to the normally low access data sets, but these were not problematic from an access tracking perspective; but (ii) a new and stealthy bot client sub-system 110 made some accesses that should have been filtered out of the access numbers, but were not. Now that the problem with bot 110 has been determined at step S409, this problem can be corrected by the system designer.

In various alternative embodiments of the present invention, there may be an unlimited number of modules (for example, sub-sub-sub-modules within the framework of traffic analysis mod 280) dedicated to analyzing anomalies to determine whether an anomaly is really a problem, or to at least determine collateral information about the anomaly so that other entities (for example, a data administrator, other diagnostic software) can do further analysis. These additional modules would be based on available web analytics dimensions (now known or to be developed in the future). These web analytics dimensions may relate to, for example, tracking users (such as browser, platform, referrer, etc). It should be understood that the responsive analysis of the present invention (to the extent it is present in a given embodiment at all) is not limited to the specifics shown in mod 280 of system 100.

Alternatively, step S409 might simply involve flagging the over-low-delta threshold condition for a human user (for example, by email) so that the human user can sift through the available data to determine whether there really is a problem indicated by the anomaly. As mentioned above, the more available information related to access requests, the better that it can be determined whether over-low-threshold delta conditions really represent problematic issues.

The flowchart and block diagrams in the foregoing Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Now that embodiment 100 has been fully discussed, some additional comments regarding and/or embodiment(s) of the present invention will be set forth in the following paragraphs.

At least some embodiments of the present invention provide a system and method that dynamically monitors low accessed content for abnormal fluctuations in the page views (hits, accesses) month to month and alerts user(s) when the fluctuation is above a specified threshold. For example, if the system normally averages 10K pages that are not accessed each month and that decreases to 3K, the system will compare last month to this month and scan for abnormal trends from the different categories of metrics (for example, browser type). If variances to the historical data are detected, the system and method will be engaged to distinguish anomalies and provide analysis in regards to what type of accesses (for example, bots, individual users, previews, etc.) are contributing.

It is generally helpful to consider the scope of what the system of the present invention is monitoring, which in this particular example is the change in zero accesses. There are some metrics that can potentially falsely trigger the analysis engine, especially if all content is monitored. For example, there are new browser types that can significantly increase access numbers, but these increases are valid. At least some embodiments of the present invention operate on the assumption that these normal increases of valid items will generally not affect zero-accessed data sets. Some preferred embodiments of the present invention will only trigger an in-depth analysis of the zero-accessed content when the zero accesses change exceeds a threshold. The analysis would then look at zero-accessed content to see what trend is in that scope to identify which dimension (e.g., browser, platform, referrer, etc) is the likely culprit.

Figure 6:
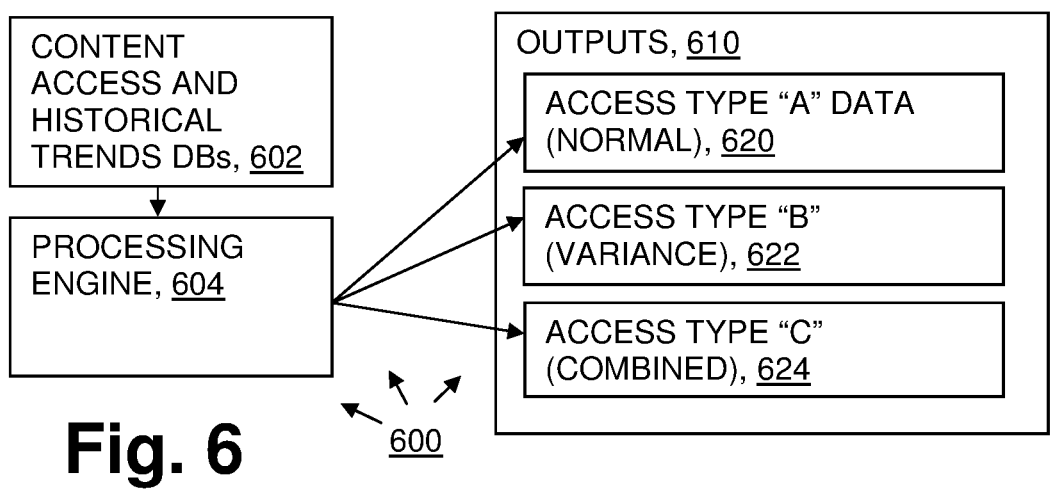
FIG. 6 is a schematic of a second embodiment of a computer system according to the present invention.

A feature of some systems according to the present invention is the ability to parse and distinguish accesses based on low content activity changes to provide a deeper analytical view of what is driving changes in content accesses. According to some embodiments of the present invention, a processing engine examines content accesses data and historical trends data to identify abnormal fluctuations. Outputs are preferably rendered to distinguish normal access, variance data (accesses outside that are deemed/identified by the processing engine to be abnormal), and combined data view. Variance data enables the data administrator to dynamically identify that there is a data variance that needs to be examined, as well as, provide in-depth data/views to increase understanding as to what is driving the variance. FIG. 6 shows this in block diagram form. Specifically, FIG. 6 shows block diagram 600 including: content access and historical trends db's 602; processing engine 604; and outputs 610. Outputs 610 includes: access type "A" data (normal) 620; access type "B" (variance) 622; and access type "C" (combined) 624.

Data attached set forth in Table 1 (below) is an "example" for how this system and method is used. In this example, an increase in Web accesses in 2012 is being attributed to a new Bing preview feature (note: the term(s) "Bing" may be subject to trademark rights in various jurisdictions throughout the world and are used here only in reference to the products or services properly denominated by the marks to the extent that such trademark rights may exist). Specifically, this new Bing feature is a right side extended preview which shows a bigger view of the page and gives URLs to links inside of the page. This Bing preview feature, in this example, is accounting for an average 2.4% increase in data set "Accesses" in the data set group and a 10.6% increase in "Percent available accessed" month-to-month in 2012. If the data administrator were looking at just the average increase to the overall accesses, the number (2.4%) would not have been significant enough to draw attention that there was unusual activity (that is, this new Bing feature) impacting accesses. However, by narrowing the scope to look at the overall percentage trends in content being accessed, this allows the data administrator to see that content not typically accessed on a regular basis had significant increase (10.6%). In this example, it is common for the average percentage of content accessed to range between 66-69% of the total content, so narrowing the scope identifies allows users viewing the back end data to see anomalies.

In Table 1 (below), the Category of "Browser Type" is isolated and examined by process engine 604. The process engine generates our 3 outputs (Normal Data 620, Variance Data 622 and Combined Data 624). In this example, the data administrator can see that the large variance for the Mozilla Firefox (note: the term(s) "Mozilla," "Firefox," and/or "Mozilla Firefox" may be subject to trademark rights in various jurisdictions throughout the world and are used here only in reference to the products or services properly denominated by the marks to the extent that such trademark rights may exist) browser type (+200) and BingPreview 1.0 (+250) would indicate an abnormally large fluctuation in page views.

Table 1 follows:

| Category | Page Views | | |
|---|---|---|---|
| Browser Type | Normal Data | Variance Data | Combined Data |
| Internet Explorer V9 | 200 | +20 | 220 |
| Internet Explorer V8 | 400 | −30 | 370 |
| Mozilla Firefox 3.6 | 300 | +200 | 500 |
| Google Chrome 19 | 100 | −10 | 90 |
| BingPreview 1.0 | 50 | +250 | 300 |
| ... | ... | ... | ... |

(Note: the term(s) "Internet Explorer," "Google," "Chrome," "Google Chrome," and/or "BingPreview" may be subject to trademark rights in various jurisdictions throughout the world and are used here only in reference to the products or services properly denominated by the marks to the extent that such trademark rights may exist). The processing engine for this invention could potentially work as follows:

Identify if there's a large fluctuation in web traffic, by analyzing multiple facets such as: 1) the number of low- or 0-accessed documents, 2) the total number of accesses, 3) categorical accesses based on company-specific metrics/taxonomies (e.g., "Accesses by product")

If there is a large fluctuation, outside of normal/expected values (either inferred by the system or set with profiles, etc), the system would dynamically analyze all appropriate web traffic dimensions (see use cases below for examples) to determine likely culprits of the fluctuation Reports are then sent to appropriate users with key information from the analysis—e.g., "Low-accessed content dropped ~20% from 49 k to 40 k docs, caused by a 1900% increase in traffic from a user agent called BingPreview"

To help explain the present invention, a couple of examples/use cases will now be discussed.

Use Case 1, determining cause of traffic spikes by using low-accessed content, will be discussed first.

A company has a large number of technical support documents on the web. Each month, the number of documents that are not accessed at all (that is, 0 accesses) by normal web users are tracked/recorded. Hypothetical data for the monthly number of non-accessed docs is as follows:

| Month | # not accessed |
|---|---|
| January | 50,000 |
| February | 49,000 |
| March | 40,000 |

A system according to the present invention analyzes this data in January, February, and March, and observes a large percent decrease in March, versus prior months. The system then further analyzes several data points for March data, including (not limited to) web traffic dimensions such as Referrer, Browser ("User Agent"), IP address groups, and Platform/OS. The system notices no significant difference from February through March in any of the following dimensions: Referrer, IP addresses and Platform. However, the system does notice a significant increase in activity for a User Agent called BingPreview, which jumps from 1 k hits (in February) to 20 k hits (in March). This increase was much more than any of the other user agents, which each had a fluctuation of +/−10%. The system thus determines that a User Agent named BingPreview was the major cause of the large discrepancy from February through March, and notifies appropriate users with this information.

Use Case 2, determining cause of traffic dips, will now be discussed. A company has a large number of technical support documents on the web. Each month, the total number of web accesses are tracked/recorded. Some hypothetical data follows:

| Month | # total accesses |
|---|---|
| January | 1 mil |
| February | 1.1 mil |
| March | 700k |

A system according to the present invention analyzes this data in January, February, and March, and observes a large percent decrease in March, versus prior months. The system then further analyzes several data points for March data, starting with internal content categories such as: Product, Segment and Division. If any large discrepancies are found for any particular value of one of these dimensions, this is added as a potential cause of the change in traffic (likely infrastructure/taxonomy issues). The system then further analyzes several data points for March, including (not limited to) web traffic dimensions such as Referrer, Browser ("User Agent"), IP address groups, and Platform/OS. In this case, it turns out that the Firefox browser had a JavaScript bug that prevented the Firefox users from tallying web accesses with this company's metrics system. As a result, the system notices a large decline in accesses from the Firefox browser, which decreased from 500 k (in February) to 250 k (in March). The system thus determines that the Firebox browser accounted for the majority of the decline, and notifies appropriate users with this information.

The following paragraphs provide definitions for certain term(s) used in this document:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

User: includes, but is not necessarily limited to, the following: (i) a single individual human; (ii) an artificial intelligence entity with sufficient intelligence to act as a user; and/or (iii) a group of related users.

Servable-and-trackable data set (sometimes, more simply, "data set"): any data set that can be accessed in a manner such that access(es) can be counted; "data sets" include, but not limited to: web pages, network pages and/or data files.

Servable-and-trackable data set group (sometimes, more simply, "data set group"): a group of one or more servable-and-trackable data sets that are grouped or capable of being grouped together for tracking purposes; there need not be subject matter similarity or common control and management between the data sets of the group.

Anomaly: any over-low-delta-threshold condition, regardless of whether the condition is indicative of a problem or whether the condition simply occurs under normal and proper operating and access tracking conditions.

Network page: any data set that is similar to a web page, whether or not the page is served over the world wide web or any other communication network.

What is claimed is:

1. A method for analyzing communication network data set access of a plurality of web pages served by a server computer system to a plurality of client computer systems, the method comprising:
   counting, for a first interval of time, a first low access count value corresponding to a count of web pages of the plurality of web pages that have not been accessed from the sever computer system and by any client computer systems, in the first interval of time;
   counting, for a second interval of time, a second low access count value corresponding to a count of web pages of the plurality of web pages that have not been accessed from the server computer system and by any the client computer systems, in the second interval of time; and
   determining a delta value equal to a difference between the first low access count value accrued during the first interval, and the second low access count value accrued during the second interval, with the first interval and the second interval being at least substantially non-overlapping intervals of time.

2. The method of claim 1 further comprising:
   determining whether the delta value exceeds a low delta threshold value; and
   responsive to a determination that the delta value does exceed the low delta threshold, determining the types of access that caused the delta value to exceed the low delta threshold value.

3. The method of claim 1 further comprising:
   determining whether the delta value exceeds a low delta threshold value; and
   responsive to a determination that the delta value does exceed the low delta threshold, determining the types of access of a plurality of types of access that caused the delta value to exceed the low delta threshold value, with the plurality of types of access including at least the following types of access: bot, individual users and previews.

4. The method of claim 1 further comprising:
   determining whether the delta value, determined at the determining-a-delta-value step, exceeds a low delta threshold value;
   responsive to a determination that the delta value does exceed the low delta threshold, determining that a browser specific anomaly has caused the delta value to exceed the low delta threshold; and
   repairing the browser specific anomaly.

5. A computer program product (CPP) for analyzing communication network data set access of a plurality of web pages served by a server computer system to a plurality of client computer systems, the CPP comprising:
   a machine readable storage device; and
   computer code stored on the machine readable storage device, with the computer code including instructions for causing a processor(s) set to perform operations including and 21 the following:
   counting, for a first interval of time, a first low access count value corresponding to a count of web pages of the plurality of web pages that have not been accessed from the sever computer system and by any client computer systems, in the first interval of time,
   counting, for a second interval of time, a second low access count value corresponding to a count of web pages of the plurality of web pages that have not been accessed from the server computer system and by any the client computer systems, in the second interval of time, and
   determining a delta value equal to a difference between the first low access count value accrued during the first interval, and the second low access count value accrued during the second interval, with the first interval and the second interval being at least substantially non-overlapping intervals of time.

6. The CPP of claim 5 wherein the computer code further includes instructions for causing the processor(s) set to perform the following operations:
   determining whether the delta value exceeds a low delta threshold value; and
   responsive to a determination that the delta value does exceed the low delta threshold, determining the types of access that caused the delta value to exceed the low delta threshold value.

7. The CPP of claim 5 wherein the computer code further includes instructions for causing the processor(s) set to perform the following operations:
   determining whether the delta value exceeds a low delta threshold value; and
   responsive to a determination that the delta value does exceed the low delta threshold, determining the types of access of a plurality of types of access that caused the delta value to exceed the low delta threshold value, with the plurality of types of access including at least the following types of access: bot, individual users and previews.

8. The CPP of claim 5 wherein the computer code further includes instructions for causing the processor(s) set to perform the following operations:
   determining whether the delta value, determined at the determining-a-delta-value step, exceeds a low delta threshold value;
   responsive to a determination that the delta value does exceed the low delta threshold, determining that a browser specific anomaly has caused the delta value to exceed the low delta threshold; and
   repairing the browser specific anomaly.

9. A computer system (CS) for analyzing communication network data set access of a plurality of web pages served by a server computer system to a plurality of client computer systems, the CS comprising:
   a processor(s) set;
   a machine readable storage device; and
   computer code stored on the machine readable storage device, with the computer code including instructions for causing the processor(s) set to perform operations including the following:
   counting, for a first interval of time, a first low access count value corresponding to a count of web pages of the plurality of web pages that have not been accessed from the sever computer system and by any client computer systems, in the first interval of time,
   counting, for a second interval of time, a second low access count value corresponding to a count of web pages of the plurality of web pages that have not been accessed from the server computer system and by any the client computer systems, in the second interval of time, and determining a delta value equal to a difference between the first low access count value accrued during the first interval, and the second low access count value accrued during the second interval, with the first interval and the second interval being at least substantially non-overlapping intervals of time.

10. The CS of claim 9 wherein the computer code further includes instructions for causing the processor(s) set to perform the following operations:

determining whether the delta value exceeds a low delta threshold value; and responsive to a determination that the delta value does exceed the low delta threshold, determining the types of access that caused the delta value to exceed the low delta threshold value.

11. The CS of claim 9 wherein the computer code further includes instructions for causing the processor(s) set to perform the following operations:

determining whether the delta value exceeds a low delta threshold value; and responsive to a determination that the delta value does exceed the low delta threshold, determining the types of access of a plurality of types of access that caused the delta value to exceed the low delta threshold value, with the plurality of types of access including at least the following types of access: bot, individual users and previews.

12. The CS of claim 9 wherein the computer code further includes instructions for causing the processor(s) set to perform the following operations:

determining whether the delta value, determined at the determining-a-delta-value step, exceeds a low delta threshold value;

responsive to a determination that the delta value does exceed the low delta threshold, determining that a browser specific anomaly has caused the delta value to exceed the low delta threshold; and repairing the browser specific anomaly.

* * * * *